(12) United States Patent
Haltiner, Jr. et al.

(10) Patent No.: US 7,147,953 B2
(45) Date of Patent: Dec. 12, 2006

(54) DUAL FUEL CELL STACKS CONNECTED IN SERIES ELECTRICALLY AND IN PARALLEL FOR GAS FLOW

(75) Inventors: Karl J. Haltiner, Jr., Fairport, NY (US); Subhasish Mukerjee, Rochester, NY (US); Diane M. England, Bloomfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 523 days.

(21) Appl. No.: 10/178,282

(22) Filed: Jun. 24, 2002

(65) Prior Publication Data

US 2003/0235740 A1   Dec. 25, 2003

(51) Int. Cl.
*H01M 8/10*   (2006.01)
(52) U.S. Cl. .............. 429/32; 429/38; 429/39; 180/65.3
(58) Field of Classification Search .......... 429/32, 429/31
See application file for complete search history.

(56) References Cited

U.S. PATENT DOCUMENTS

| | | | | |
|---|---|---|---|---|
| 5,549,983 | A | * | 8/1996 | Yamanis ............ 429/32 |
| 6,001,501 | A | * | 12/1999 | Collie ............ 429/31 |
| 6,110,612 | A | * | 8/2000 | Walsh ............ 429/13 |
| 6,321,145 | B1 | | 11/2001 | Rajashekara |
| 6,380,637 | B1 | * | 4/2002 | Hsu et al. ............ 290/1 R |
| 6,423,896 | B1 | | 7/2002 | Keegan |
| 6,455,179 | B1 | * | 9/2002 | Sugita et al. ............ 429/12 |
| 6,455,185 | B1 | | 9/2002 | Bircann et al. |
| 6,485,852 | B1 | | 11/2002 | Miller et al. |
| 6,495,279 | B1 | * | 12/2002 | Bogicevic et al. ............ 429/32 |
| 6,509,113 | B1 | | 1/2003 | Keegan |
| 6,551,734 | B1 | | 4/2003 | Simpkins et al. |
| 6,562,496 | B1 | | 5/2003 | Faville et al. |
| 6,608,463 | B1 | | 8/2003 | Kelly et al. |
| 6,613,468 | B1 | | 9/2003 | Simpkins et al. |
| 6,613,469 | B1 | | 9/2003 | Keegan |
| 6,627,339 | B1 | | 9/2003 | Haltiner, Jr. |
| 6,630,264 | B1 | | 10/2003 | Haltiner, Jr. et al. |
| 6,756,144 | B1 | * | 6/2004 | Issacci et al. ............ 429/26 |
| 2003/0235743 | A1 | * | 12/2003 | Haltiner, Jr. ............ 429/35 |

* cited by examiner

*Primary Examiner*—Bruce F. Bell
(74) *Attorney, Agent, or Firm*—Paul L. Marshall

(57) ABSTRACT

A fuel cell assembly comprising a plurality of individual fuel cells, especially a solid-oxide fuel cell assembly. The cells are organized into a plurality of stacks, preferably two stacks, disposed side-by-side rather than end-to-end as in a prior art monolithic single stack. This arrangement makes the assembly compact physically, which can be highly desirable in some fuel cell applications. The stacks are connected conventionally in series electrically but are supplied with air and fuel in parallel to shorten the distribution manifolds and improve uniformity of distribution and exhaust among all the cells.

20 Claims, 4 Drawing Sheets

DUAL FUEL CELL STACKS CONNECTED IN SERIES ELECTRICALLY AND IN PARALLEL FOR GAS FLOW

STATEMENT REGARDING FEDERALLY SPONSORED RESEARCH OR DEVELOPMENT

This invention was made with United States Government support under Government Contract No. DE-FC26-02NT41246. The Government has certain rights in the invention.

TECHNICAL FIELD

The present invention relates to hydrogen/oxygen fuel cells having an electrolytic layer separating an anode layer from a cathode layer; more particularly, to fuel cell stack assemblies and systems comprising a plurality of individual cells; and most particularly, to such fuel cell stack assemblies and systems wherein the plurality of cells is subassembled into two stacks connected electrically in series, and wherein incoming air and fuel are each split into two streams to supply the two stacks in parallel.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived from "reformed" hydrocarbons, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

A prior art fuel cell stack may comprise 60 or more individual cells, assembled together in a single stack. Whether oriented vertically or horizontally, such a stack is ungainly and does not lend itself to compact packaging of a fuel cell assembly as is desirable in some applications. Further, it is difficult to provide uniform flows of air and fuel to all cells in the stack because of pressure losses in long, narrow gas distributors.

It is a principal object of the present invention to provide a compact solid oxide fuel cell assembly.

It is a further object of the present invention to improve the distribution of air and fuel to a multi-cell fuel cell assembly.

BRIEF DESCRIPTION OF THE INVENTION

Briefly described, in a fuel cell assembly comprising a plurality of individual fuel cells, especially a solid-oxide fuel cell assembly, the cells are organized into a plurality of stacks, preferably two stacks, disposed side-by-side, with cells horizontal, rather than end-to-end as in a monolithic single stack. This arrangement makes the assembly compact physically, which can be highly desirable in some fuel cell applications. The stacks are connected conventionally in electrical series but are supplied with air and fuel in parallel to shorten the distribution manifold chimneys and improve the uniformity of distribution and exhaust among all the cells.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
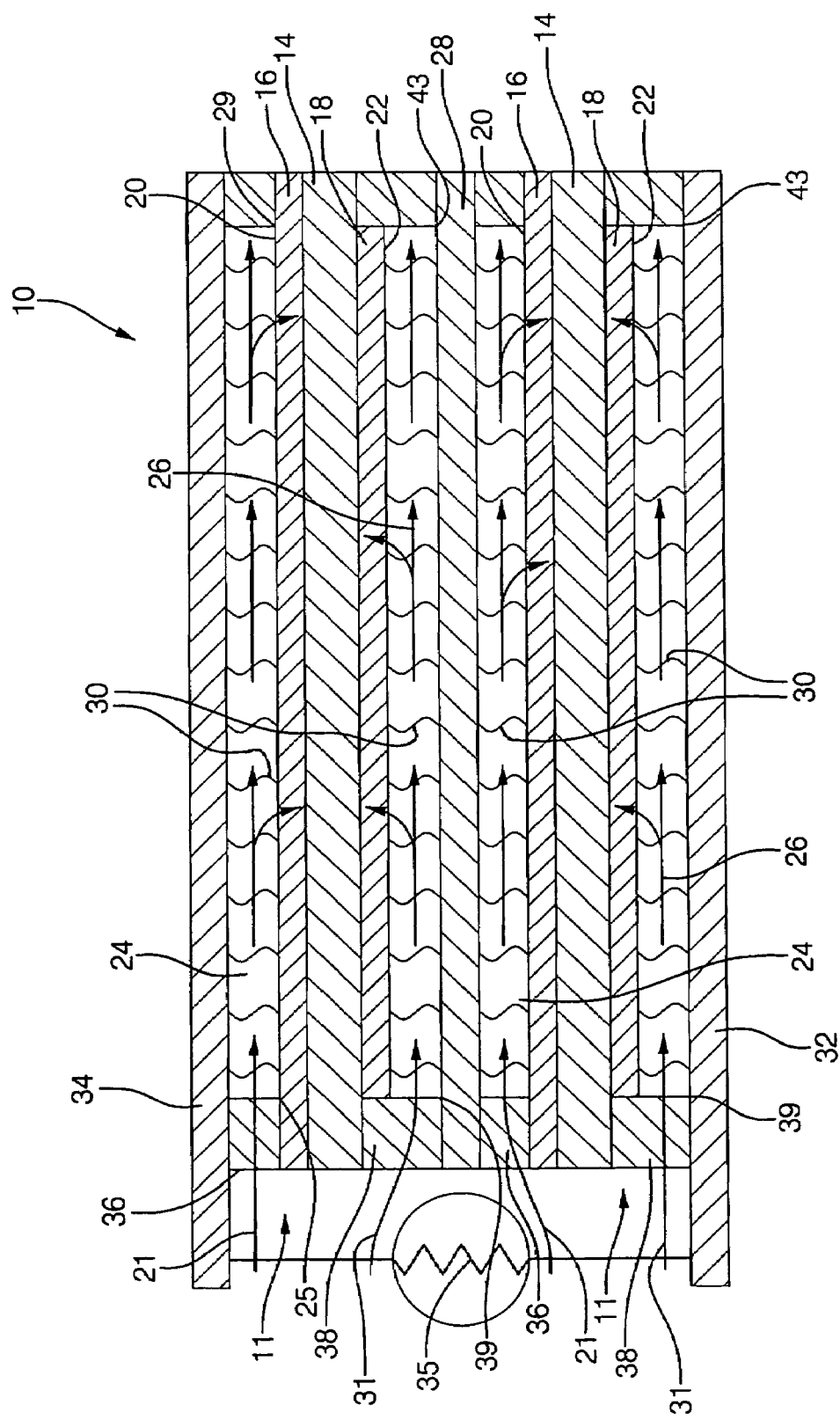
FIG. 1 is a schematic cross-sectional view of a two-cell stack of solid oxide fuel cells.

Referring to FIG. 1, a fuel cell stack 10 includes elements known in the art of solid oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 faces and is electrically connected to an interconnect 28 by filaments 30 extending across but not blocking passageway 24. Similarly, cathode 18 faces and is electrically connected to interconnect 28 by filaments 30 extending across but not blocking passageway 26. Similarly, cathode 18 faces and is electrically connected to a cathodic current collector 32 by filaments 30 extending across but not blocking passageway 26, and anode 16 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells 11 are connected in series electrically between the two current collectors, and the total voltage and wattage between the current collectors is the sum of the voltage and wattage of the individual cells in a fuel cell stack.

Figure 2:
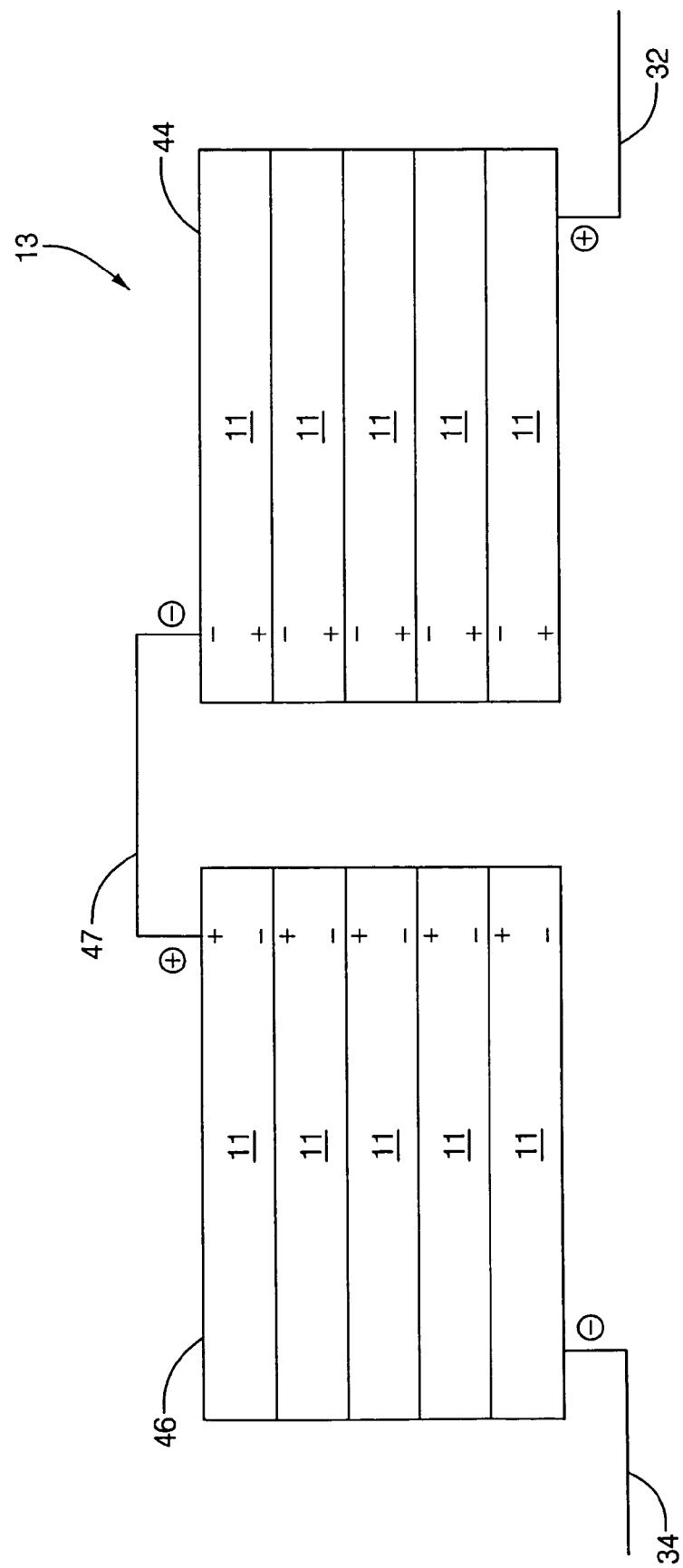
FIG. 2 is a schematic elevational view of two fuel cell stacks arranged in electrical series in accordance with the invention.
Figure 4:
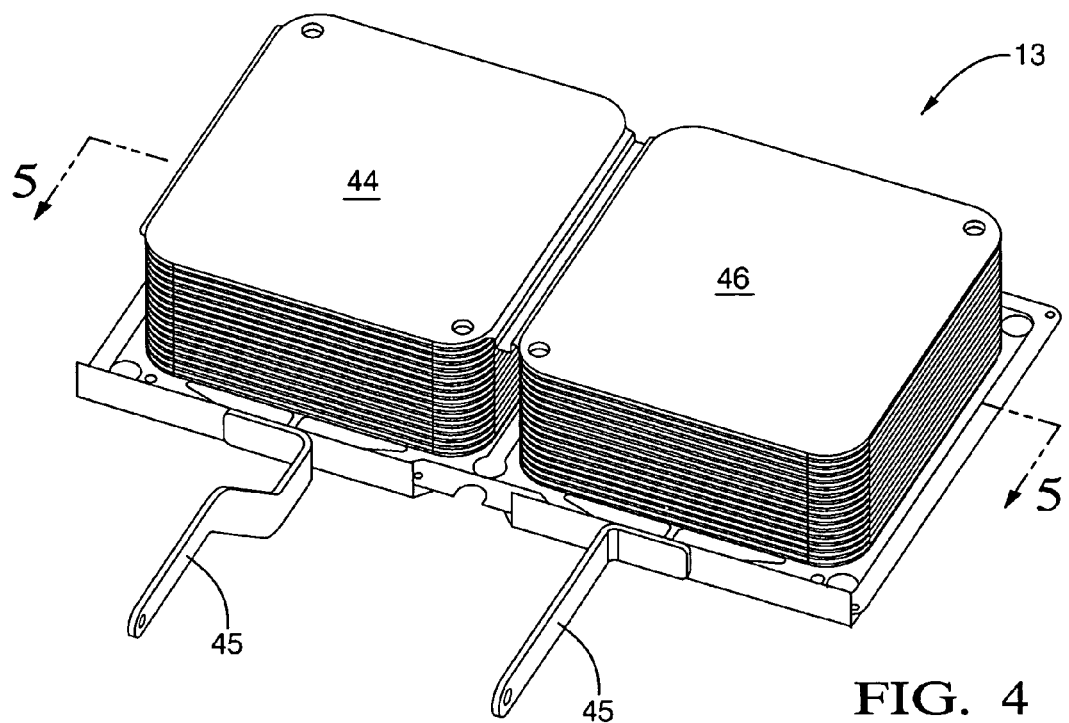
FIG. 4 is an isometric view of the two fuel cell stacks shown schematically in FIG. 2.
Figure 5:
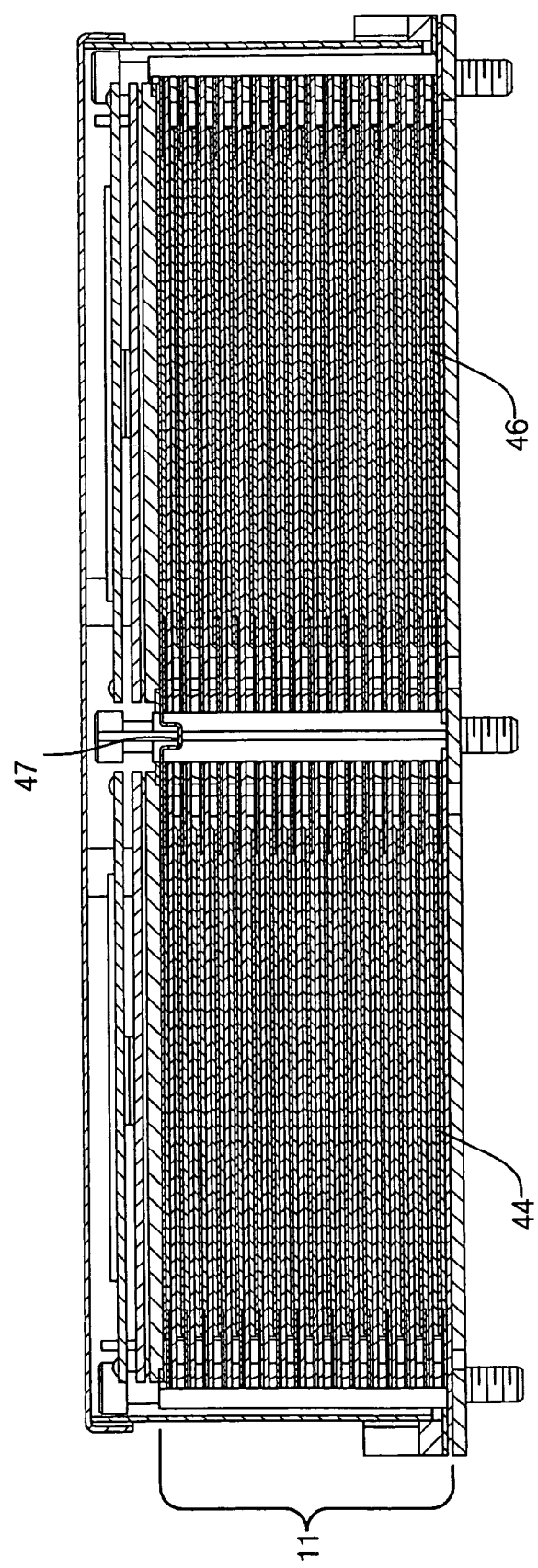
FIG. 5 is a cross-sectional plan view of the two fuel cell stacks, in an assembly.

Referring to FIGS. 4 and 5, in a fuel cell assembly 13 in accordance with the invention, the cells 11 are arranged side-by-side and are oriented substantially horizontally as shown. It is desirable to orient a stack with cells stacked one above the other, the plane of each cell being substantially horizontal, so that gravitational forces act to keep the stack in compression. This eliminates shear stresses between the cells and/or bending stresses within the stack due to gravity. Also, the largest shock and vibrational forces are in the vertical direction. The side-by-side arrangement of the present invention, as shown in FIGS. 4 and 5, may comprise a plurality of cells 11, respectively, such that each of first stack 44 and second stack 46 shown in FIG. 2 is a stack of identical fuel cells 11. The number of cells in each stack may be the same, or the stacks may comprise different numbers of fuel cells, as desired. The cells 11 in stack 44 and stack 46 are connected electrically in series within the stacks, and the stacks are connected in series by interconnect 47. Note that for convenience of electrical connection, the stacks preferably are arranged head-to-tail, i.e., stack 44 has a negative end up and stack 46 has a positive end up. In addition, and as a result of a head-to-tail connection of the stacks, gas flow streams are mirror imaged for the two stacks because the inlet and outlet manifolds or air and fuel within the stack are not symmetrical. This simplifies the plumbing and manifolding to the stacks. As shown in FIG. 4, power leads 45 conveniently attach to the bottom of each stack. The side-by-side fuel cell stacks described above are shown schematically in FIG. 2.

Figure 3:
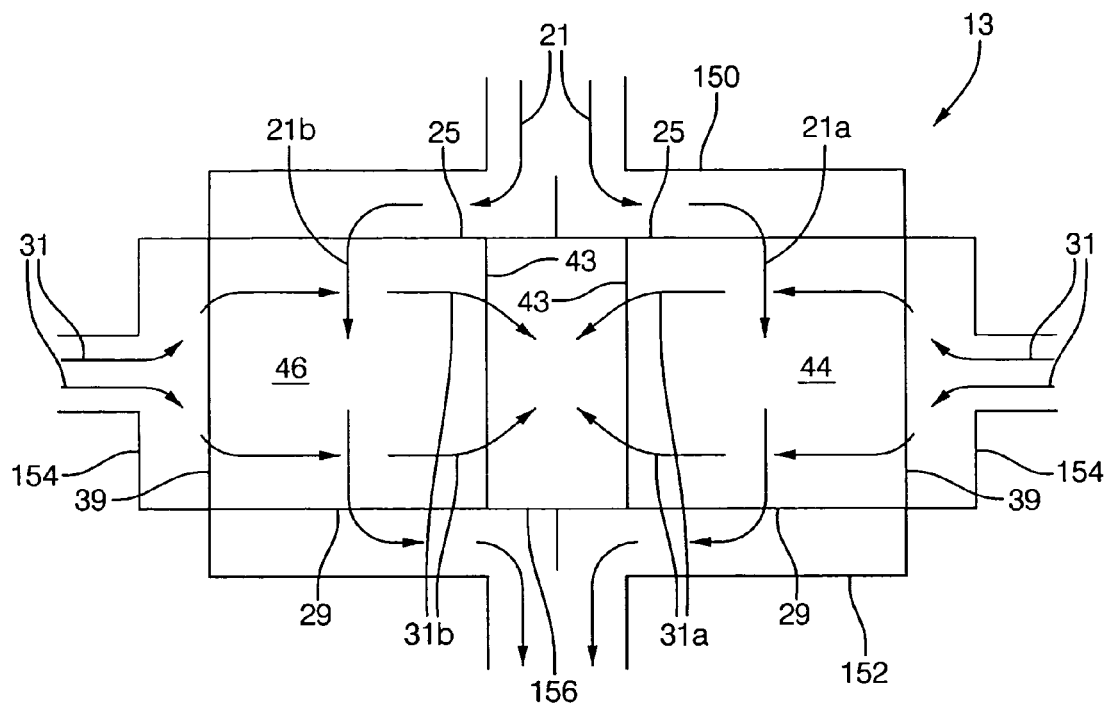
FIG. 3 is a schematic plan view of the two fuel cell stacks shown in FIG. 2, including air and fuel manifolds for parallel flows of air and fuel through the stacks.

Referring to FIG. 3, it is seen that placing stacks 44 and 46 side by side permits parallel and/or mirror imaged supply and exhaust of reformate fuel 21 to the two stacks, as well as parallel and/or mirror imaged supply and exhaust of air 31. Reformate flow 21a flowing through stack 44 is in parallel with reformate flow 21b flowing through stack 46. Air flow 31a flowing through stack 44 is in parallel with air flow 31b flowing through stack 46. Although not evident in FIG. 3, the fuel supply and exhaust manifolds 150,152, respectively, and the air supply and exhaust manifolds 154,156, respectively, extend vertically along stacks 44,46 to service all the cells in both stacks. Also, in the schematic drawing of FIG. 3, the fuel and air flows appear to cross at right angles, whereas in actuality the anode passageways 24 and cathode passageways 26 alternate vertically in the stacks, as shown in FIG. 1.

A side-by-side arrangement also results in shorter stacks which aid in achieving uniform flow of fuel and air from cell-to-cell within the stack. Achieving uniform flow in a taller stack would require larger manifolds which would occupy more of the available space.

A fuel cell assembly in accordance with the invention is especially useful as an auxiliary power unit (APU) for vehicles 132 on which the APU may be mounted as shown in FIG. 1, such as cars and trucks, boats and ships, and airplanes, wherein motive power is supplied by a conventional engine and the auxiliary electrical power needs are met by the fuel cell assembly.

A fuel cell assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly, comprising:
   a) a plurality of fuel cell stacks, each stack containing a plurality of individual fuel cells, and said plurality of fuel cells and stacks being connected electrically in series, and said stacks being arranged side-by-side and electrically connected head-to-tail;
   b) at least one fuel manifold for providing fuel to said stacks and for removing spent fuel from said stacks, said at least one fuel manifold being arranged for flow of fuel through said stacks; and
   c) at least one air manifold for providing air to said stacks and for removing spent air from said stacks, said at least one air manifold being arranged for flow of air through said stacks, wherein said at least one fuel manifold is arranged for at least one of parallel or mirror imaged flow of fuel through said stacks, and wherein said flow of air and said flow of fuel cross at a non-parallel angle within at least one of said stacks.

2. A fuel cell assembly in accordance with claim 1 wherein said flow of air and said flow of fuel cross orthogonally within at least one of said stacks.

3. A fuel cell assembly in accordance with claim 1 wherein said flow of air and said flow of fuel alternate vertically within said at least on of said stacks.

4. A fuel cell assembly in accordance with claim 1 wherein said at least one air manifold is arranged for at least one of parallel or mirror imaged flow of air through said stacks.

5. A fuel cell assembly in accordance with claim 1 comprising two fuel cell stacks.

6. A fuel cell assembly in accordance with claim 1 wherein said fuel cells are solid-oxide fuel cells.

7. A fuel cell assembly in accordance with claim 1 wherein said assembly is mounted on a vehicle.

8. A fuel cell assembly in accordance with claim 7 wherein said vehicle is selected from the group consisting of car, truck, boat, and airplane.

9. A fuel cell assembly in accordance with claim 7 wherein said assembly is an auxiliary power unit for said vehicle.

10. A fuel cell assembly in accordance with claim 1 wherein said plurality of fuel cells are arranged horizontally.

11. A vehicle, comprising a fuel cell assembly for generating auxiliary power for said vehicle, said assembly including:
    a) a plurality of fuel cell stacks, each stack containing a plurality of individual fuel cells, and said plurality of fuel cells and stacks being connected electrically in series, and said stacks being arranged side-by-side and electrically connected head-to-tail;
    b) at least one fuel manifold for providing fuel to said stacks and for removing spent fuel from said stacks, said at least one fuel manifold being arranged for flow of fuel through said stacks; and
    c) at least one air manifold for providing air to said stacks and for removing spent air from said stacks, said at least one air manifold being arranged for flow of air through said stacks, wherein said at least one fuel manifold is arranged for at least one of parallel or mirror imaged flow of fuel through said stacks, and wherein said flow of air and said flow of fuel cross at a non-parallel angle within at least one of said stacks.

12. A vehicle in accordance with claim 11 wherein said flow of air and said flow of fuel cross orthogonally within at least one of said stacks.

13. A vehicle in accordance with claim 11 wherein said flow of air and said flow of fuel alternate vertically within said at least on of said stacks.

14. A vehicle in accordance with claim 11 wherein said at least one air manifold is arranged for at least one of parallel or mirror imaged flow of air through said stacks.

15. A vehicle in accordance with claim 11 comprising two fuel cell stacks.

16. A vehicle in accordance with claim 11 wherein said fuel cells are solid-oxide fuel cells.

17. A vehicle in accordance with claim 11 wherein said assembly is mounted on a vehicle.

18. A vehicle in accordance with claim 17 wherein said vehicle is selected from the group consisting of car, truck, boat, and airplane.

19. A vehicle in accordance with claim 17 wherein said assembly is an auxiliary power unit for said vehicle.

20. A vehicle in accordance with claim 11 wherein said plurality of fuel cells are arranged horizontally.

* * * * *